United States Patent
Lu

(10) Patent No.: US 11,906,141 B1
(45) Date of Patent: Feb. 20, 2024

(54) HANGING PLANT GROWTH LIGHTING DEVICE WITH SPECTRUM ADJUSTMENT FUNCTION

(71) Applicant: Shinegrow (Xiamen) Lighting Technology Co., LTD., Fujian (CN)

(72) Inventor: Fuxing Lu, Fujian (CN)

(73) Assignee: Shinegrow (Xiamen) Lighting Technology Co., LTD., Fujian (CN)

( * ) Notice: Subject to any disclaimer, the term of this patent is extended or adjusted under 35 U.S.C. 154(b) by 0 days.

(21) Appl. No.: 18/121,582

(22) Filed: Mar. 14, 2023

(30) Foreign Application Priority Data

Aug. 19, 2022 (CN) .......................... 202222195340.7
Aug. 19, 2022 (CN) .......................... 202222198473.X

(51) Int. Cl.
| | | |
|---|---|---|
| *F21V 21/16* | (2006.01) | |
| *F21S 4/28* | (2016.01) | |
| *F21V 21/008* | (2006.01) | |
| *A01G 9/24* | (2006.01) | |

(52) U.S. Cl.
CPC .............. *F21V 21/16* (2013.01); *A01G 9/249* (2019.05); *F21S 4/28* (2016.01); *F21V 21/008* (2013.01)

(58) Field of Classification Search
CPC ..... F21S 8/061; F21S 8/06; F21S 4/28; F21V 21/008; F21V 21/14; A01G 7/045
See application file for complete search history.

(56) References Cited

U.S. PATENT DOCUMENTS

2017/0135290 A1* 5/2017 Sahni ...................... A01G 22/00
2019/0230868 A1* 8/2019 Tao ......................... A01G 7/045
2020/0278090 A1* 9/2020 McCanless ............... F21S 8/06

OTHER PUBLICATIONS

Innovation Q+ NPL Search (Year: 2023).*

* cited by examiner

*Primary Examiner* — Anabel Ton
(74) *Attorney, Agent, or Firm* — Winston Hsu

(57) ABSTRACT

A hanging plant growth lighting device with spectrum adjustment function includes a frame, a power source module, a plurality of light source modules, a dimming module and a hanging structure. The frame includes a first frame bar, a second frame bar and a connecting portion. The power source module is disposed in the connecting portion. The light source modules are electrically connected to the power source module. The two ends of each of the light source modules are fixed at the first frame bar and second frame bar respectively. The dimming module is electrically connected to the power source module. The hanging structure includes a retractable structure, two first hanging rings fixed on the first frame bar and two second hanging rings fixed on the second frame bar. The retractable structure is connected to the two first hanging rings and the two second hanging rings.

10 Claims, 7 Drawing Sheets

HANGING PLANT GROWTH LIGHTING DEVICE WITH SPECTRUM ADJUSTMENT FUNCTION

BACKGROUND OF THE INVENTION

1. Field of the Invention

The present invention relates to a lighting device, in particular to a hanging plant growth lighting device with spectrum adjustment function.

2. Description of the Prior Art

Most of currently available plant growth lighting devices are integrated-type lighting devices. The spectrum of the light emitted by an integrated-type lighting device cannot be adjusted. Therefore, if the user needs to change the spectrum of the light, the user should replace at least some of the lighting devices so as to promote the growth of the plants. If a currently available plant growth lighting device malfunctions, it is necessary to replace the lighting device by another one or remove lighting device for repairing. Thus, the lighting system cannot be always in normal status.

Further, currently available plant growth lighting devices are usually fixed on the ceiling of the indoor farm, so the distances between these lighting devices and the ground are usually not adjustable. Thus, these lighting devices cannot satisfy the requirements of indoor farms and other similar applications.

SUMMARY OF THE INVENTION

One embodiment of the present invention provides a hanging plant growth lighting device with spectrum adjustment function, which includes a frame, a power source module, a plurality of light source modules, a dimming module and a hanging structure. The frame includes a first frame bar, a second frame bar and a connecting portion. The first frame bar is connected to the second frame bar via the connecting portion. The power source module is disposed in the connecting portion. The light source modules are electrically connected to the power source module. One end of each light source module is fixed at the first frame bar and the other end thereof is fixed at the second frame bar. The dimming module is electrically connected to the power source module. The hanging structure includes a retractable structure, two first hanging rings fixed on the first frame bar and two second hanging rings fixed on the second frame bar. The retractable structure is connected to the two first hanging rings and the two second hanging rings.

In one embodiment of the present invention, the dimming module receives a dimming signal. The power source module generates a driving signal according to the dimming signal in order to drive the light source modules and adjust a spectrum of lights emitted by the light source modules.

In one embodiment of the present invention, the retractable structure includes a first adjusting rope, a second adjusting rope, a first balance rope and a second balance rope. The first adjusting rope is connected to the two first hanging rings via the first balance rope and the second adjusting rope is connected to the two second hanging rings via the second balance rope.

In one embodiment of the present invention, the first balance rope and the second balance rope are made of a metal material.

In one embodiment of the present invention, the first adjusting rope includes a first ring body. The first balance rope penetrates through the first ring body and the two ends of the first balance rope are fixed at the two first hanging rings. The second adjusting rope includes a second ring body. The second balance rope penetrates through the second ring body and the two ends of the second balance rope are fixed at the two second hanging rings.

In one embodiment of the present invention, the first adjusting rope further includes a first lifting wheel and a first connecting rope. One end of the first connecting rope is fixed at the first ring body and the other end of the first connecting rope penetrates through the first lifting wheel. The second adjusting rope further includes a second lifting wheel and a second connecting rope. One end of the second connecting rope is fixed at the second ring body and the other end of the second connecting rope penetrates through the second lifting wheel.

In one embodiment of the present invention, the first lifting wheel and the second lifting wheel receive a height adjusting signal in order to adjust the length of the first connecting rope and the length of the second connecting rope.

In one embodiment of the present invention, the two first hanging rings are fixed at the fixation side of the first frame bar and the two second hanging rings are fixed at the fixation side of the second frame bar. The fixation side of the first frame bar is opposite to the fixation side of the second frame bar.

In one embodiment of the present invention, the distance between the two first hanging rings is substantially equal to ⅔ of the length of the first frame bar and the distance between the two second hanging rings is substantially equal to ⅔ of the length of the second frame bar.

In one embodiment of the present invention, the light source modules are detachably fixed at the first frame bar and the second frame bar respectively.

The hanging plant growth lighting device with spectrum adjustment function in accordance with the embodiments of the present invention may have the following advantages:

(1) In one embodiment of the present invention, the hanging plant growth lighting device has a dimming module in order to provide the dimming function. Therefore, the user can dynamically adjust the spectrum of the light emitted by the hanging plant growth lighting device with a view to promoting the growth of the plant. Thus, the hanging plant growth lighting device can satisfy the requirements of indoor farms and other similar applications.

(2) In one embodiment of the present invention, the hanging plant growth lighting device has an adjustable hanging structure, such that the distance of the hanging plant growth lighting device and the ground can be adjustable. Thus, the user can properly adjust the distance between the hanging plant growth lighting device and the ground so as to effectively promote the growth of the plant, which is more flexible in use. As a result, the hanging plant growth lighting device can conform to actual requirements.

(3) In one embodiment of the present invention, the hanging plant growth lighting device has a special structure design, which can effectively avoid that the frame is deformed due to the external force applied by the hanging structure. Accordingly, the service life of the hanging plant growth lighting device can be significantly extended.

(4) In one embodiment of the present invention, the hanging plant growth lighting device has the modularized light source modules and the modularized light source modules are detachably disposed at the frame thereof. Thus, the user can increase or decrease the number of the lighting source modules according to actual requirements, which is more flexible in use. In addition, the user can conveniently and swiftly replace the light source module which malfunctions, so the lighting system can be always in normal status.

(5) In one embodiment of the present invention, all components of the hanging plant growth lighting device are modularized. Therefore, the hanging plant growth lighting device is not only convenient in transportation, but also can effectively save more storage space, which can greatly reduce the transportation cost and storage cost thereof.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
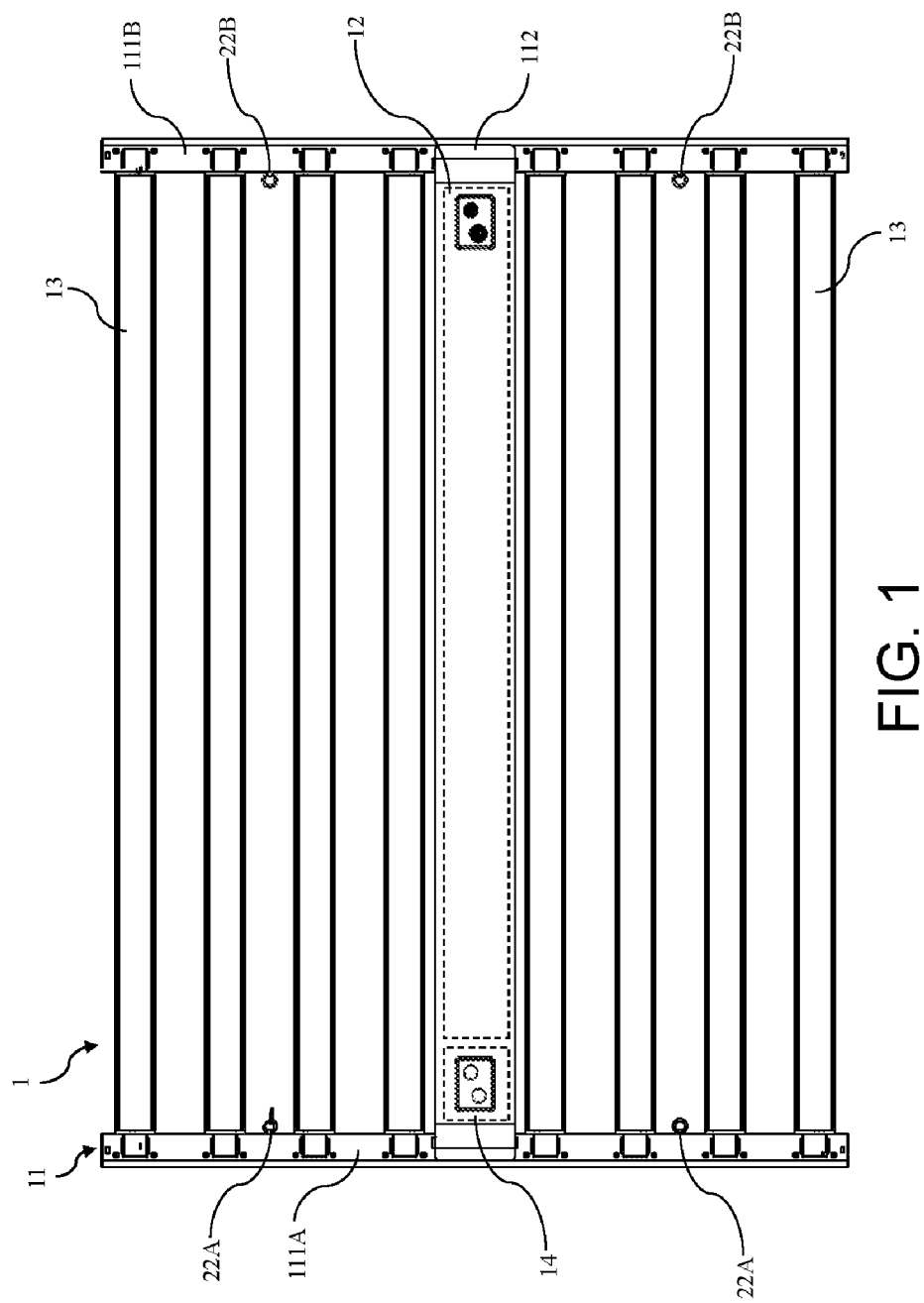
FIG. 1 is a top view of a hanging plant growth lighting device with spectrum adjustment function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
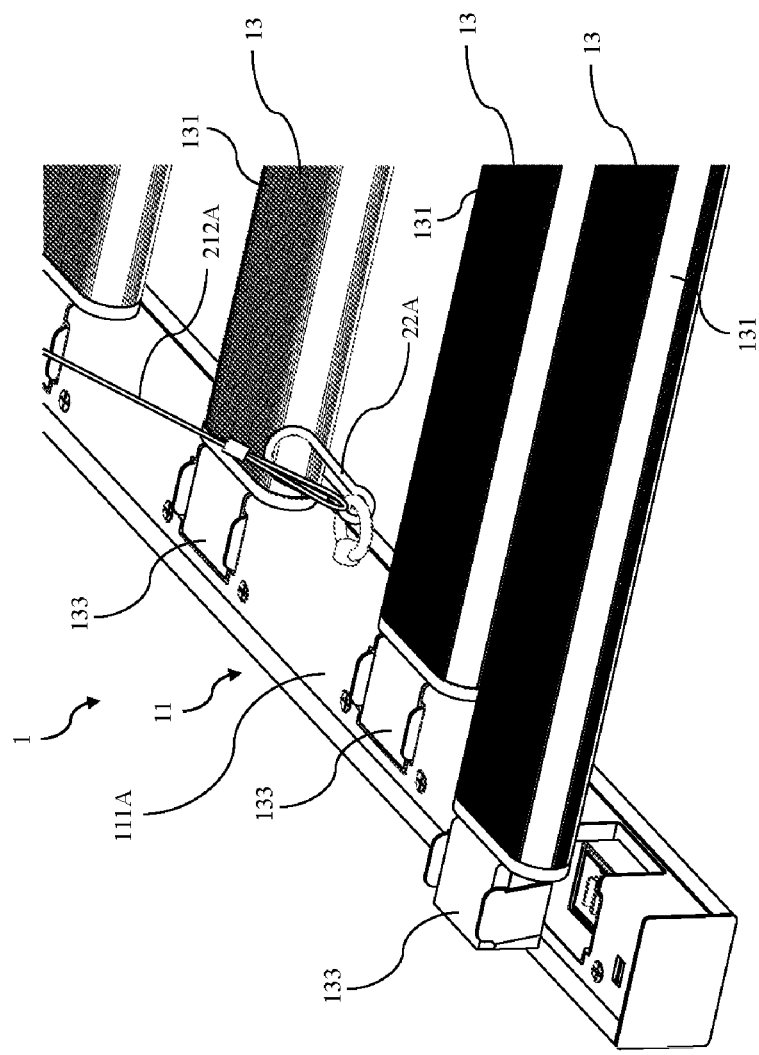
FIG. 2 is a partial enlargement view of the hanging plant growth lighting device with spectrum adjustment function in accordance with one embodiment of the present invention.

Please refer to FIG. 1 and FIG. 2, which are a top view and a partial enlargement view of a hanging plant growth lighting device with spectrum adjustment function in accordance with one embodiment of the present invention. As shown in FIG. 1 and FIG. 2, the hanging plant growth lighting device 1 includes a frame 11, a power source module 12, a plurality of light source modules 13 and a dimming module 14.

The frame 11 includes a first frame bar 111A, a second frame bar 111B and a connecting portion 112. The first frame bar 111A is connected to the second frame bar 111B via the connecting portion 112. In one embodiment, the frame 11 may be made of a non-metallic material, such as plastics. In another embodiment, the frame 11 may be made of a metal material, such as aluminum, copper, stainless steel, etc.

The power source module 12 is disposed in the connecting portion 112. In one embodiment, the power source module 12 includes one or more of a filter circuit, a rectifier circuit, a transformer circuit and a converter circuit, etc.

The above light source modules 13 may be modularized light source modules and electrically connected to the power source module 12. One end of each of the light source modules 13 is fixed at the first frame bar 111A and the other end thereof is fixed at the second frame bar 111B, such that the light source modules 13 are parallel to each other. The above light source modules 13 may be detachably fixed at the first frame bar 111A and the second frame bar 111B. In one embodiment, the light source module 13 may be a light-emitting diode (LED) module or other similar components.

The dimming module 14 is electrically connected to the power source module 12. The dimming module 14 receives a dimming signal and the power source module 12 generates a driving signal according to the dimming signal so as to drive the light source modules 12 and adjust the spectrum of the lights emitted by the light source modules 12. In one embodiment, the dimming module 14 may be a pulse-width modulation (PWM) dimming circuit or other currently available dimming circuits. In addition, the dimming module 14 may further include a signal receiving module (e.g., antenna) so as to receive the dimming signal. Via the dimming module 14, the user can periodically and dynamically adjust the spectrum, brightness and/or color temperature of the light emitted by the hanging plant growth lighting device 1 so as to effectively promote the growth of the plant. The user can execute the application for controlling the hanging plant growth lighting device 1 via an electronic device (e.g., a smart phone, a tablet computer, a laptop computer, a personal computer, etc.) in order to perform the above spectrum adjustment.

As previously stated, all components of the hanging plant growth lighting device 1 can be modularized. Therefore, the user can increase or decrease the number of the lighting source modules 13 according to actual requirements, which is more flexible in use. Moreover, via the above structure design, the hanging plant growth lighting device 1 is not only convenient in transportation, but also can effectively save more storage space, which can significantly reduce the transportation cost and storage cost thereof.

Further, if any one of the light source modules 13 malfunctions, the user can directly remove this light source module 13 for repairing or replace this light source module 13 by another light source module 13. In this way, the hanging plant growth lighting device 1 can be always in normal status.

Figure 3:
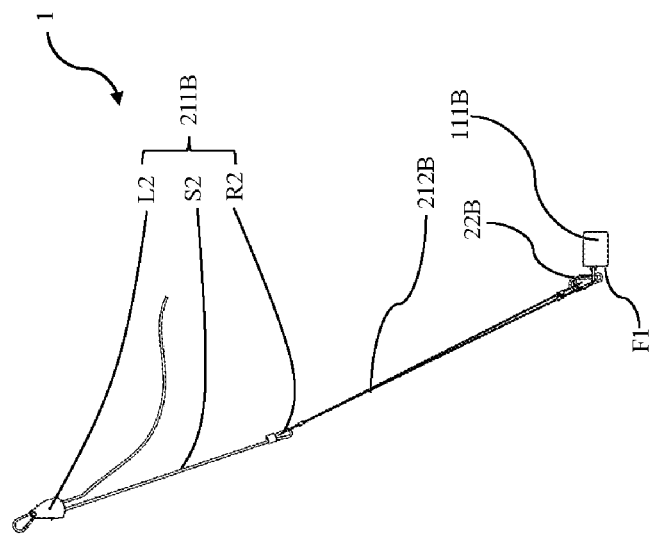
FIG. 3 is a first side view of the hanging plant growth lighting device with spectrum adjustment function in accordance with one embodiment of the present invention.
Figure 3:
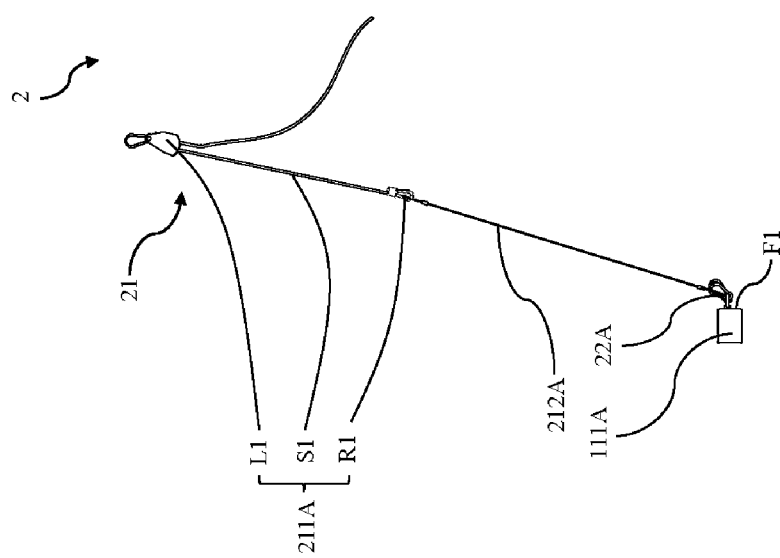
Figure 4:
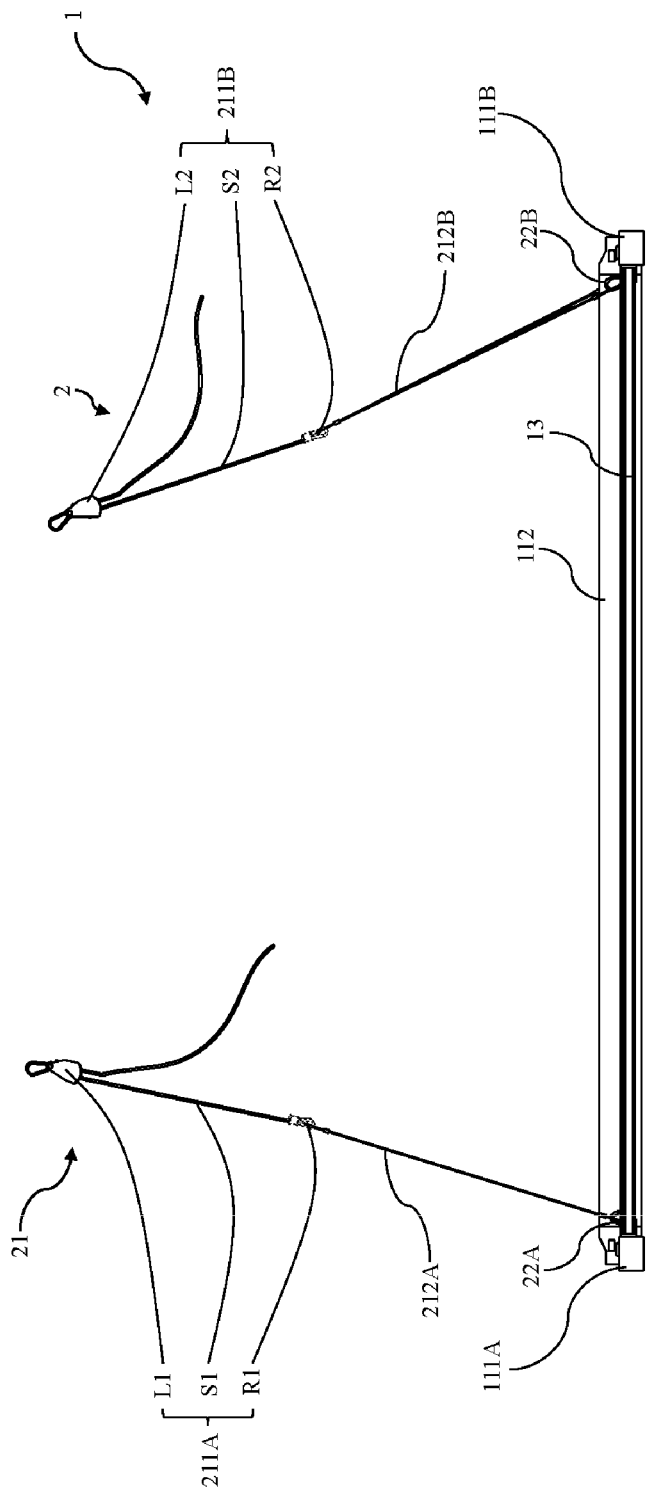
FIG. 4 is a second side view of the hanging plant growth lighting device with spectrum adjustment function in accordance with one embodiment of the present invention.

Please refer to FIG. 3 and FIG. 4, which are a first side view (with the light source modules 13) and a second side view (without the light source modules 13) of the hanging plant growth lighting device with spectrum adjustment function in accordance with one embodiment of the present invention. As shown in FIG. 3 and FIG. 4, the hanging plant growth lighting device 1 further includes a hanging structure 2. The hanging structure 2 includes a retractable structure 21, two first hanging rings 22A and two second hanging rings 22B.

The retractable structure 21 includes a first adjusting rope 211A, a second adjusting rope 211B, a first balance rope 212A and a second balance rope 212B. The first adjusting rope 211A is connected to the two first hanging rings 22A via the first balance rope 212A. The second adjusting rope 211B is connected to the two second hanging rings 22B via the second balance rope 212B. In one embodiment, the first balance rope 212A and the second balance rope 212B are made of a metal material (e.g., wire rope).

The first adjusting rope 211A includes a first ring body R1, a first lifting wheel L1 and a first connecting rope S1. The first balance rope 212A penetrates through the first ring body R1 and the two ends of the first balance rope 212A are fixed at the two first hanging rings 22A respectively. One end of the first connecting rope S1 is fixed at the first ring body R1 and the other end of the first connecting rope S1 penetrates through the first lifting wheel L1. Via the above structure, the user can adjust the length of the first connecting rope S1 via the first lifting wheel L1.

The second adjusting rope 211B includes a second ring body R1, a second lifting wheel L2 and a second connecting rope S2. The second balance rope 212B penetrates through the second ring body R2 and the two ends of the second balance rope 212B are fixed at the two second hanging rings 22B respectively. One end of the second connecting rope S2 is fixed at the second ring body R2 and the other end of the second connecting rope S2 penetrates through the second lifting wheel L2. Via the above structure, the user can adjust the length of the second connecting rope S2 via the second lifting wheel L2.

The first lifting wheel L1 and the second lifting wheel L2 can receive a height adjustment signal so as to adjust the lengths of the first connecting rope S1 and second connecting rope S2. In the embodiment, the first lifting wheel L1 may include a controller and a motor. In addition, the first lifting wheel L1 may further include a signal receiving module (e.g., antenna) in order to receive the height adjustment signal. The controller is connected to the motor and the signal receiving module, so the controller can control the motor to adjust the length of the first connecting rope S1 according to the height adjustment signal. Similarly, the second lifting wheel L2 may also include a controller, a motor and a signal receiving module in order to adjust the length of the second connecting rope S2 by the same mechanism. As a result, the user can properly adjust the distance between the hanging plant growth lighting device 1 and the ground according to the height of the plant in order to effectively promote the growth of the plant. Similarly, the user can execute the application for controlling the hanging plant growth lighting device 1 by the electronic device in order to execute the above height adjustment.

As shown in FIG. 3 and FIG. 4, the two first hanging rings 22A are fixed at the fixation side F1 of the first frame bar 111A and the two second hanging rings 22B are fixed at the fixation side F2 of the second frame bar 111B. In addition, the distance between the two first hanging rings 22A is substantially equal to ⅔ of the length of the first frame bar 111A. Similarly, the distance between the two second hanging rings 22B is substantially equal to ⅔ of the length of the second frame bar 111B. The above structure design can effectively avoid that the frame 11 is deformed due to the external force applied by the hanging structure 2, which can greatly enhance the structural stability of the hanging plant growth lighting device 1 and extend the service life thereof.

As described above, as the hanging plant growth lighting device 1 has the adjustable hanging structure 2, the distance between the hanging plant growth lighting device 1 and the ground is adjustable. Thus, the user can properly adjust the distance between the hanging plant growth lighting device 1 and the ground according to the height of the plant in order to effectively promote the growth of the plant. Accordingly, the hanging plant growth lighting device 1 can be more flexible in use and meet actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that most of currently available plant growth lighting devices are integrated-type lighting devices, which usually need to be fixed on the ceiling of the indoor farm. Thus, the distances between these lighting devices and the ground are usually not adjustable. Besides, if the user needs to change the spectrum of the light, the user should replace at least some of the lighting devices so as to promote the growth of the plants. On the contrary, according to one embodiment of the present invention, the hanging plant growth lighting device has a dimming module in order to provide the dimming function. Therefore, the user can dynamically adjust the spectrum of the light emitted by the hanging plant growth lighting device with a view to promoting the growth of the plant. Thus, the hanging plant growth lighting device can satisfy the requirements of indoor farms and other similar applications.

Also, according to one embodiment of the present invention, the hanging plant growth lighting device has an adjustable hanging structure, such that the distance of the hanging plant growth lighting device and the ground can be adjustable. Thus, the user can properly adjust the distance between the hanging plant growth lighting device and the ground so as to effectively promote the growth of the plant, which is more flexible in use. As a result, the hanging plant growth lighting device can conform to actual requirements.

Further, according to one embodiment of the present invention, the hanging plant growth lighting device has a special structure design, which can effectively avoid that the frame is deformed due to the external force applied by the hanging structure. Accordingly, the service life of the hanging plant growth lighting device can be significantly extended.

Moreover, according to one embodiment of the present invention, the hanging plant growth lighting device has the modularized light source modules and the modularized light source modules are detachably disposed at the frame thereof. Thus, the user can increase or decrease the number of the lighting source modules according to actual requirements, which is more flexible in use. In addition, the user can conveniently and swiftly replace the light source module which malfunctions, so the lighting system can be always in normal status.

Furthermore, according to one embodiment of the present invention, all components of the hanging plant growth lighting device are modularized. Therefore, the hanging plant growth lighting device is not only convenient in transportation, but also can effectively save more storage space, which can greatly reduce the transportation cost and storage cost thereof. As set forth above, the hanging plant growth lighting device according to the embodiments of the present invention can definitely achieve great technical effects.

Figure 5:
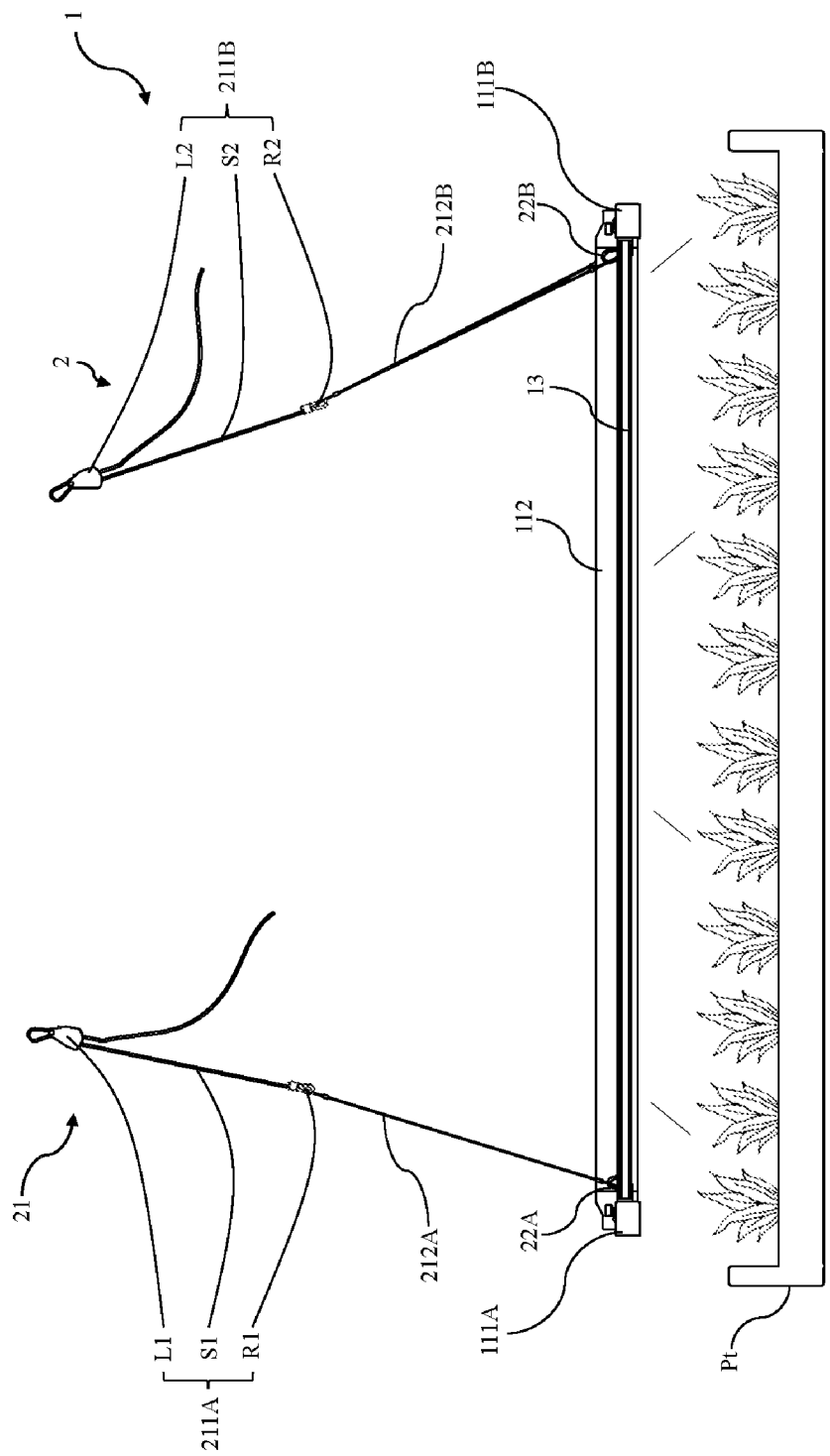
FIG. 5 is a first schematic view of an operational state of the hanging plant growth lighting device with spectrum adjustment function in accordance with one embodiment of the present invention.
Figure 6:
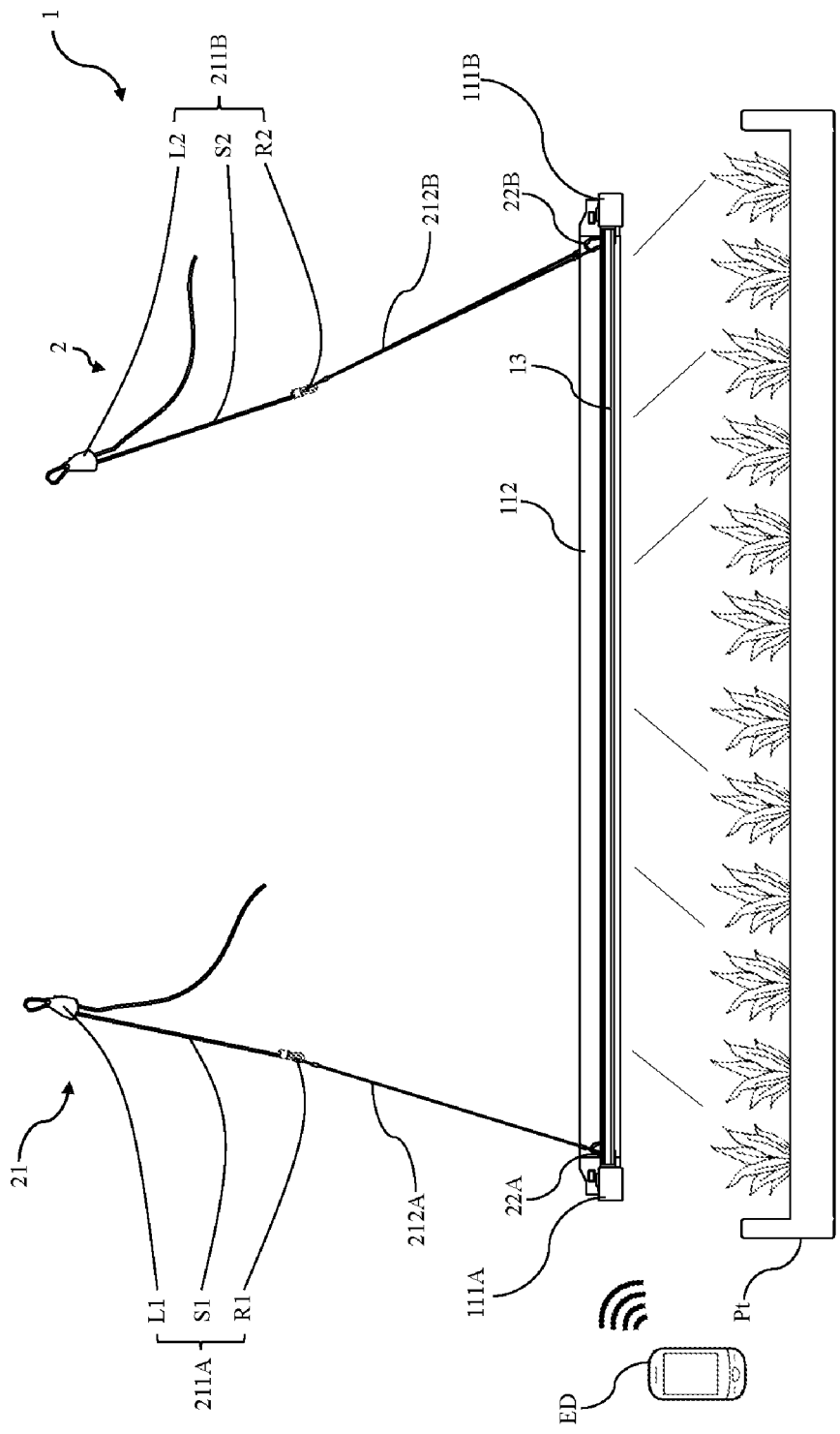
FIG. 6 is a second schematic view of the operational state of the hanging plant growth lighting device with spectrum adjustment function in accordance with one embodiment of the present invention.

Please refer to FIG. 5 and FIG. 6, which is a first schematic view and a second schematic view of an operational state of the hanging plant growth lighting device with spectrum adjustment function in accordance with one embodiment of the present invention. As shown in FIG. 5, the hanging plant growth lighting device 1 can be installed on the ceiling of an indoor farm and emit light toward the plant Pt in the indoor farm.

As shown in FIG. 6, the user can execute an application for controlling the hanging plant growth lighting device 1 by an electronic device ED to transmit a dimming signal. Then, the spectrum of the light emitted by the hanging plant growth lighting device 1 can be adjusted by the dimming signal in order to effectively promote the growth of the plant Pt. In addition, the user can execute the application for controlling the hanging plant growth lighting device 1 by the electronic device ED to transmit a height adjustment signal in order to adjust the distance between the hanging plant growth lighting device 1 and the ground.

The embodiment just exemplifies the present invention and is not intended to limit the scope of the present invention; any equivalent modification and variation according to the spirit of the present invention is to be also included within the scope of the following claims and their equivalents.

Figure 7:
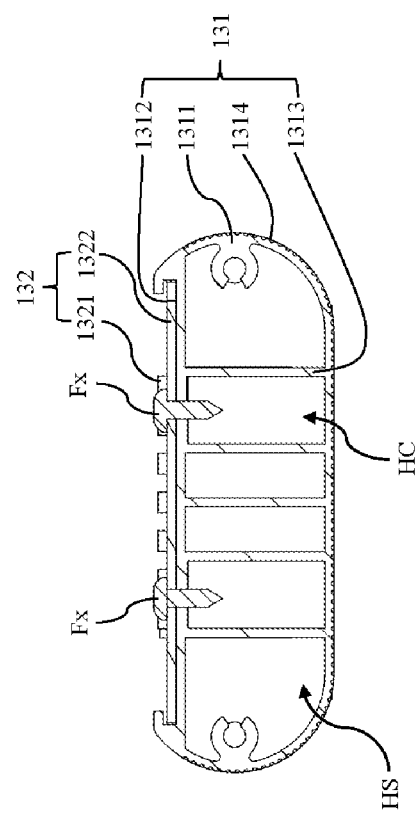
FIG. 7 is a sectional view of a light source module of the hanging plant growth lighting device with spectrum adjustment function in accordance with one embodiment of the present invention.

Please refer to FIG. 7, which is a sectional view of a light source module of the hanging plant growth lighting device with spectrum adjustment function in accordance with one embodiment of the present invention; please also refer to FIG. 2. As shown in FIG. 2 and FIG. 7, each light source module 13 includes a housing 131, a light source board 132 and two end caps 133. The light source board 132 is disposed in the housing 131. The light source board 132 includes a plurality of light-emitting units 1321 and a circuit board 1322. The light-emitting units 1321 are disposed on the circuit board 1322. In one embodiment, the light-emitting units 1321 may be light-emitting diodes (LED) or other currently available light sources.

The housing 131 of each of the light source modules 13 includes an outer casing 1311, an installation surface 1312, a plurality of partition plates 1313 and a plurality of cooling fins 1314. The light source board 132 is fixed on the installation surface 1312 by a plurality of fixation members Fx. The installation surface 1312 is disposed outside the outer casing 1311, such that a heat dissipation space HS is formed between the outer casing 1311 and the installation surface 1312. The above partition plates 1313 are disposed in the heat dissipation space HS, such that a plurality of heat dissipation chambers HC can be formed in the heat dissipation space HS. The above cooling fins 1314 can be disposed on the outer surface of the outer casing 1311. The housing 131 of each of the light source modules 13 includes an outer casing 1311, an installation surface 1312, a plurality of partition plates 1313 and a plurality of cooling fins 1314. The light source board 132 is fixed on the installation surface 1312. The installation surface 1312 is disposed outside the outer casing 1311, such that a heat dissipation space HS is formed between the outer casing 1311 and the installation surface 1312. The above partition plates 1313 are disposed in the heat dissipation space HS, such that a plurality of heat dissipation chambers HC can be formed in the heat dissipation space HS. The above cooling fins 1314 can be disposed on the outer surface of the outer casing 1311.

As previously stated, the housing 131 of each light source module 13 of the hanging plant growth lighting device 1 can have the aforementioned partition plates 1313, which can form several heat dissipation chambers HC. Besides, the housing 131 can be further provided with a large amount of cooling fins 1314. The composite heat dissipation structure integrating the two heat dissipation structures (the heat dissipation chambers HC and the cooling fins 1314) with each other can greatly increase the total surface area of the inner structure and the outer structure of each light source module 13 in order to effectively enhance the heat dissipation performance thereof. Accordingly, the service life of the hanging plant growth lighting device 1 can be greatly increased.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the hanging plant growth lighting device has a dimming module in order to provide the dimming function. Therefore, the user can dynamically adjust the spectrum of the light emitted by the hanging plant growth lighting device with a view to promoting the growth of the plant. Thus, the hanging plant growth lighting device can satisfy the requirements of indoor farms and other similar applications.

Also, according to one embodiment of the present invention, the hanging plant growth lighting device has an adjustable hanging structure, such that the distance of the hanging plant growth lighting device and the ground can be adjustable. Thus, the user can properly adjust the distance between the hanging plant growth lighting device and the ground so as to effectively promote the growth of the plant, which is more flexible in use. As a result, the hanging plant growth lighting device can conform to actual requirements.

Further, according to one embodiment of the present invention, the hanging plant growth lighting device has a special structure design, which can effectively avoid that the frame is deformed due to the external force applied by the hanging structure. Accordingly, the service life of the hanging plant growth lighting device can be significantly extended.

Moreover, according to one embodiment of the present invention, the hanging plant growth lighting device has the modularized light source modules and the modularized light source modules are detachably disposed at the frame thereof. Thus, the user can increase or decrease the number of the lighting source modules according to actual requirements, which is more flexible in use. In addition, the user can conveniently and swiftly replace the light source module which malfunctions, so the lighting system can be always in normal status.

Furthermore, according to one embodiment of the present invention, all components of the hanging plant growth lighting device are modularized. Therefore, the hanging plant growth lighting device is not only convenient in transportation, but also can effectively save more storage space, which can greatly reduce the transportation cost and storage cost thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hanging plant growth lighting device with spectrum adjustment function, comprising:
   a frame comprising a first frame bar, a second frame bar and a connecting portion, wherein the first frame bar is connected to the second frame bar via the connecting portion;
   a power source module disposed in the connecting portion;
   a plurality of light source modules electrically connected to the power source module, wherein one end of each of the light source modules is fixed at the first frame bar and the other end thereof is fixed at the second frame bar;
   a dimming module electrically connected to the power source module; and
   a hanging structure comprising a retractable structure, two first hanging rings fixed on the first frame bar and two second hanging rings fixed on the second frame bar, wherein the retractable structure is connected to the two first hanging rings and the two second hanging rings, wherein the retractable structure comprises a first adjusting rope, a second adjusting rope, a first balance rope and a second balance rope, wherein the first adjusting rope is connected to the two first hanging rings via the first balance rope and the second adjusting rope is connected to the two second hanging rings via the second balance rope.

2. The hanging plant growth lighting device with spectrum adjustment function as claimed in claim 1, wherein the dimming module is configured to receive a dimming signal and the power source module is configured to generate a driving signal according to the dimming signal in order to drive the light source modules and adjust a spectrum of lights emitted by the light source modules.

3. The hanging plant growth lighting device with spectrum adjustment function as claimed in claim 1, wherein the first balance rope and the second balance rope are made of a metal material.

4. The hanging plant growth lighting device with spectrum adjustment function as claimed in claim 1, wherein the first adjusting rope comprises a first ring body, the first balance rope penetrates through the first ring body and two ends of the first balance rope are fixed at the two first hanging rings, wherein the second adjusting rope comprises a second ring body, the second balance rope penetrates through the second ring body and two ends of the second balance rope are fixed at the two second hanging rings.

5. The hanging plant growth lighting device with spectrum adjustment function as claimed in claim 4, wherein the first adjusting rope further comprises a first lifting wheel and a first connecting rope, one end of the first connecting rope is fixed at the first ring body and the other end of the first connecting rope penetrates through the first lifting wheel, wherein the second adjusting rope further comprises a second lifting wheel and a second connecting rope, one end of the second connecting rope is fixed at the second ring body and the other end of the second connecting rope penetrates through the second lifting wheel.

6. The hanging plant growth lighting device with spectrum adjustment function as claimed in claim 5, wherein the first lifting wheel and the second lifting wheel are configured to receive a height adjusting signal in order to adjust a length of the first connecting rope and a length of the second connecting rope.

7. The hanging plant growth lighting device with spectrum adjustment function as claimed in claim 1, wherein the two first hanging rings are fixed at a fixation side of the first frame bar and the two second hanging rings are fixed at a fixation side of the second frame bar, wherein the fixation side of the first frame bar is opposite to the fixation side of the second frame bar.

8. The hanging plant growth lighting device with spectrum adjustment function as claimed in claim 7, wherein a distance between the two first hanging rings is substantially equal to ⅔ of a length of the first frame bar and a distance between the two second hanging rings is substantially equal to ⅔ of a length of the second frame bar.

9. The hanging plant growth lighting device with spectrum adjustment function as claimed in claim 1, wherein the light source modules are detachably fixed at the first frame bar and the second frame bar respectively.

10. The hanging plant growth lighting device with spectrum adjustment function as claimed in claim 1, wherein each of the light source modules comprises a housing, a light source board and two end caps.

* * * * *